(12) United States Patent
Ano

(10) Patent No.: US 9,787,961 B2
(45) Date of Patent: Oct. 10, 2017

(54) PROJECTOR AND METHOD FOR CONTROLLING PROJECTOR

(71) Applicant: Seiko Epson Corporation, Tokyo (JP)

(72) Inventor: Takahiro Ano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/403,721

(22) Filed: Jan. 11, 2017

(65) Prior Publication Data

US 2017/0201732 A1    Jul. 13, 2017

(30) Foreign Application Priority Data

Jan. 13, 2016 (JP) ................... 2016-004091

(51) Int. Cl.
*H04N 5/64* (2006.01)
*H04N 9/31* (2006.01)

(52) U.S. Cl.
CPC ........... *H04N 9/3185* (2013.01); *H04N 9/312* (2013.01); *H04N 9/315* (2013.01)

(58) Field of Classification Search
CPC .......... H04N 5/64; H04N 9/31; H04N 9/3185; H04N 9/312; H04N 9/315; G06F 3/0481; G06F 3/01; G06F 3/04815; G06F 3/017
USPC ......... 348/744, 745, 141, 142, 143; 345/629
See application file for complete search history.

(56) References Cited

U.S. PATENT DOCUMENTS 6,385,331 B2 * 5/2002 Harakawa .......... G06K 9/00335
345/156
9,214,010 B2 * 12/2015 Kawaguchi ............... G06T 5/00
9,471,983 B2 * 10/2016 Yagishita ............. G06T 7/0042
9,619,104 B2 * 4/2017 Xin ...................... G06F 3/04815
2012/0062591 A1 * 3/2012 Omura .................. G06F 3/0416
345/629
2013/0314439 A1   11/2013 Ota et al.
2015/0248174 A1   9/2015 Ano

FOREIGN PATENT DOCUMENTS

| JP | 2013-242821 A | 12/2013 |
| JP | 2013-247486 A | 12/2013 |
| JP | 2015-166922 A | 9/2015 |
| JP | 2015-166923 A | 9/2015 |
| JP | 2015-184696 A | 10/2015 |
| WO | WO-2013-175819 A | 11/2013 |

* cited by examiner

*Primary Examiner* — Trang U Tran
(74) *Attorney, Agent, or Firm* — ALG Intellectual Property, LLC

(57) ABSTRACT

A projector includes a projection section, a size identification section that identifies the dimension of an image, a position identification section that periodically identifies the coordinates of the position of an indicating body, a correction section that determines a correction range in accordance with the dimension, corrects the coordinates of the position of the indicating body, in a case where newly identified coordinates are shifted from first coordinates identified before the newly identified coordinates but fall within the correction range, to the first coordinates, and outputs the corrected coordinates, and the correction section uses a first correction range in a case where the dimension of the image is equal to a first dimension and uses a second correction range narrower than the first correction range as the correction range in a case where the dimension of the image is equal to a second dimension greater than the first dimension.

8 Claims, 8 Drawing Sheets

| VIDEO IMAGE SIZE | CORRECTION RANGE |
|---|---|
| GREATER THAN OR EQUAL TO 50 INCHES BUT SMALLER THAN 60 INCHES | 10 |
| GREATER THAN OR EQUAL TO 60 INCHES BUT SMALLER THAN 70 INCHES | 9 |
| GREATER THAN OR EQUAL TO 70 INCHES BUT SMALLER THAN 80 INCHES | 8 |
| GREATER THAN OR EQUAL TO 80 INCHES BUT SMALLER THAN 90 INCHES | 7 |
| GREATER THAN OR EQUAL TO 90 INCHES BUT SMALLER THAN 100 INCHES | 6 |
| GREATER THAN OR EQUAL TO 100 INCHES | 5 |

| VIDEO IMAGE SIZE | CORRECTION RANGE |
|---|---|
| 50 INCHES | 10 |
| 60 INCHES | 9 |
| 70 INCHES | 8 |
| 80 INCHES | 7 |
| 90 INCHES | 6 |
| GREATER THAN OR EQUAL TO 100 INCHES | 5 |

PROJECTOR AND METHOD FOR CONTROLLING PROJECTOR

CROSS-REFERENCE

The entire disclosure of Japanese Patent Application No. 2016-004091, filed Jan. 13, 2016 is expressly incorporated by reference herein.

BACKGROUND

1. Technical Field

The present invention relates to a projector and a method for controlling the projector.

2. Related Art

JP-A-2013-247486, for example, discloses projector as an invention using an indicating body as a pointing device. The projector includes an imaging device, and the imaging device images the indicating body. The projector then identifies the coordinates of the indicating body in a projection area on the basis of video images produced by the imaging and caries out a drawing process on the basis of the identified coordinates. Some projectors that project an image from a PC (personal computer) have the function of handling the indicating body in the same manner in which the PC handles the mouse and operating the PC via the indicating body.

When the indicating body is so moved as to approach a display surface on which the video images are projected, and the coordinates of the indicating body are detected before the indicating body comes into contact with the display surface, the coordinates in the direction along the display surface may change after the detection but before the indicating body comes into contact with the display surface. In this case, if a process to be carried out when the indicating body is moved along the display surface is carried out in accordance with the change in the coordinates, and when a user intends to perform, for example, drag operation, an icon or any other object undesirably moves irrespective of the actual situation in which the user has not moved the indicating body in the direction along the display surface. Further, in this case, when the size of the projected video images decreases, the amount of change in the coordinates in the direction along the display surface unnecessarily increases.

SUMMARY

An advantage of some aspects of the invention is to provide a technology for suppressing a shift in coordinates that occurs when the indicating body is so moved to approach the display surface even when the size of projected video images changes.

An aspect of the invention provides a projector including a projection section that projects an image on a display surface, an imaging section that images the display surface and outputs a captured image produced by the imaging, a size identification section that identifies a dimension of the image projected on the display surface based on the captured image, a position identification section that periodically identifies coordinates of a position of an indicating body with respect to the display surface based on the captured image, a correction section that determines a correction range for correction of the coordinates in accordance with the dimension of the image identified by the size identification section, corrects the coordinates of the position of the indicating body, in a case where coordinates newly identified by the position identification section are shifted from first coordinates identified before the newly identified coordinates but fall within the correction range, to the first coordinates, and outputs the corrected coordinates, and a processing section that outputs the coordinates outputted by the correction section to an external apparatus, wherein the correction section uses a first correction range as the correction range in a case where the dimension of the image identified by the size identification section is equal to a first dimension and uses a second correction range narrower than the first correction range as the correction range in a case where the dimension of the image identified by the size identification section is equal to a second dimension greater than the first dimension.

According to the projector, even when the size of projected video images changes, the amount of shift of the output coordinates that may occur when the indicating body is so moved as to approach the display surface can be suppressed.

In the aspect of the invention, the projector may further include a light emitter that forms a light layer along the display surface, the imaging section may image the light reflected off the indicating body, and the position identification section may identify the coordinates of the position of the indicating body based on a position of the light displayed in the image outputted by the imaging section.

According to the configuration described above, in a case where the indicating body is a finger or any other non-self-luminous object, the coordinates of the position of the indicating body can be identified and outputted.

In the aspect of the invention, the size identification section may identify part of the image as an effective area, and the correction section may determine the correction range in accordance with a ratio of the dimension identified by the size identification section to a dimension of the effective area identified by the size identification section.

According to the configuration described above, the correction range can be changed in accordance with the content of a projected image.

In the aspect of the invention, the correction section may have a table that relates the dimension to the correction range, and a correction range that is in the table and related to the dimension identified by the size identification section may be determined as the correction range.

According to the configuration described above, a correction range according to the dimension of projected video images can be readily obtained.

In the aspect of the invention, in a case where the table does not contain the dimension identified by the size identification section, the correction section may select a correction range related to a dimension smaller than the dimension identified by the size identification section from dimensions contained in the table as the correction range for correction of the position.

According to the configuration described above, the correction range can be determined even in a case where the table does not contain a correction range according to the dimension of projected video images.

In the aspect of the invention, the first coordinates may be the coordinates of the position of the indicating body in a case where a state in which the coordinates of the position of the indicating body have not been identified transitions to a state in which the coordinates have been identified.

According to the configuration described above, a shift of the coordinates of the position of the indicating body that may occur when the indicating body is so moved as to approach the display surface can be suppressed.

In the aspect of the invention, in a case where the coordinates of a position newly identified by the position identification section are shifted from the first coordinates and do not fall within the correction range, the correction section may output the coordinates of the newly identified position.

According to the configuration described above, after the coordinates of the position of the indicating body go out of the correction range, the coordinates of a newly identified position can be outputted.

Another aspect of the invention provides a method for controlling a projector including a projection section that projects an image on a display surface and an imaging section that images the display surface and outputs a captured image produced by the imaging, the method including identifying a dimension of the image projected on the display surface based on the image outputted by the imaging section, periodically identifying coordinates of a position of an indicating body with respect to the display surface based on the captured image, determining a correction range for correction of the coordinates in accordance with the dimension of the image identified in the identifying of the dimension of the image, correcting the coordinates of the position of the indicating body, in a case where coordinates newly identified in identifying of the coordinates of the position of the indicating body are shifted from first coordinates identified before the newly identified coordinates but fall within the correction range, to the first coordinates, and outputting the corrected coordinates, and outputting the corrected coordinates to an external apparatus, wherein the correcting of the coordinates of the position of the indicating body uses a first correction range as the correction range in a case where the dimension of the image identified in the size identification step is equal to a first dimension and uses a second correction range narrower than the first correction range as the correction range in a case where the dimension of the image identified in the size identification step is equal to a second dimension greater than the first dimension.

According to the method, even when the size of projected video images changes, the amount of shift of the output coordinates that may occur when the indicating body is so moved as to approach the display surface can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
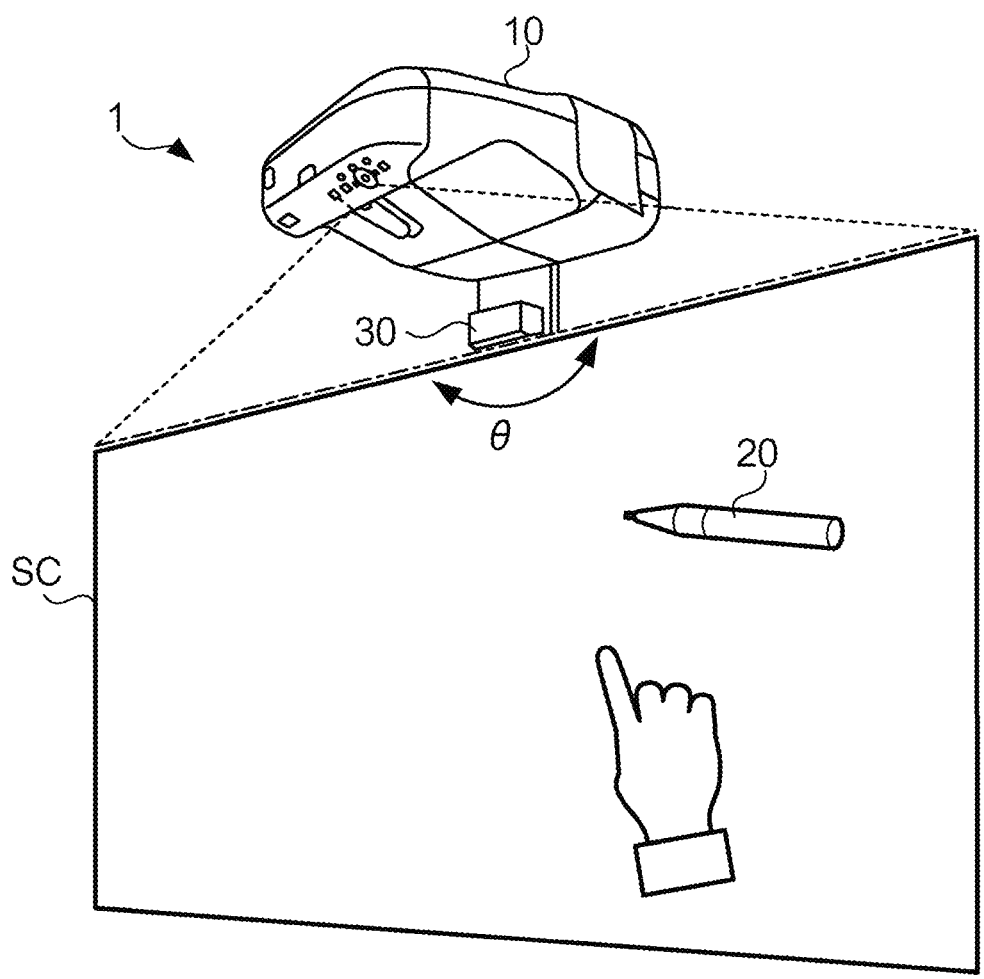
FIG. 1 shows an apparatus that forms a display system.

FIG. 1 shows an apparatus that forms a display system 1 according to an embodiment of the invention. The display system 1 includes a projector 10, which projects an image on a screen SC, which serves as an image display surface, an indicating body 20, and a light emitter 30.

The projector 10, which is an example of a display apparatus, is connected to an external apparatus, such as a PC (personal computer), and projects an image carried on a video signal supplied from the external apparatus on the screen SC. The projector 10 has a drawing function of drawing an image in a position indicated with the indicating body 20 or a finger and a PC operation function of using the indicating body 20 or a finger as a pointing device of the connected PC.

The projector 10 according to the present embodiment is installed obliquely above the screen SC and projects video images toward the screen SC. In the present embodiment, the projector 10 projects video images toward the screen SC, but the video images may be projected on a wall surface (display surface) in place of the screen SC. Further, in the present embodiment, the projector 10 is configured to be installed on a wall surface with a metal fixture but may instead be installed on a ceiling.

The indicating body 20, which has a pen-like shape, functions as a pointing device in the case where the drawing function and the PC operation function described above are used, and the indicating body 20 is used, for example, when a user operates the PC's GUI (graphical user interface) projected by the projector 10 and when the user writes something on a projected image.

The light emitter 30 includes a light emitting section that emits light (infrared light in the present embodiment) with which a finger present on the screen SC is irradiated. The light emitter 30 is installed above the upper end of the screen SC and emits the light downward in such a way that the light diffuses over an angular range θ. The light emitted from the light emitter 30 forms a light layer extending along the screen SC. In the present embodiment, the angle θ reaches almost 180°, and the light layer is formed roughly over the entire screen SC. The light layer formed by the light emitter 30 is preferably close to the surface of the screen SC. The light layer has a thickness so that the finger located in a position separate from the surface of the screen SC is also irradiated with the light. Instead, the light emitter may be formed of light emitters layered on each other, and the finger located in a position further separate from the surface of the screen SC may be irradiated with the light from the layered light emitters. The light emission from the light emitter 30 is controlled by the projector 10.

Figure 2:
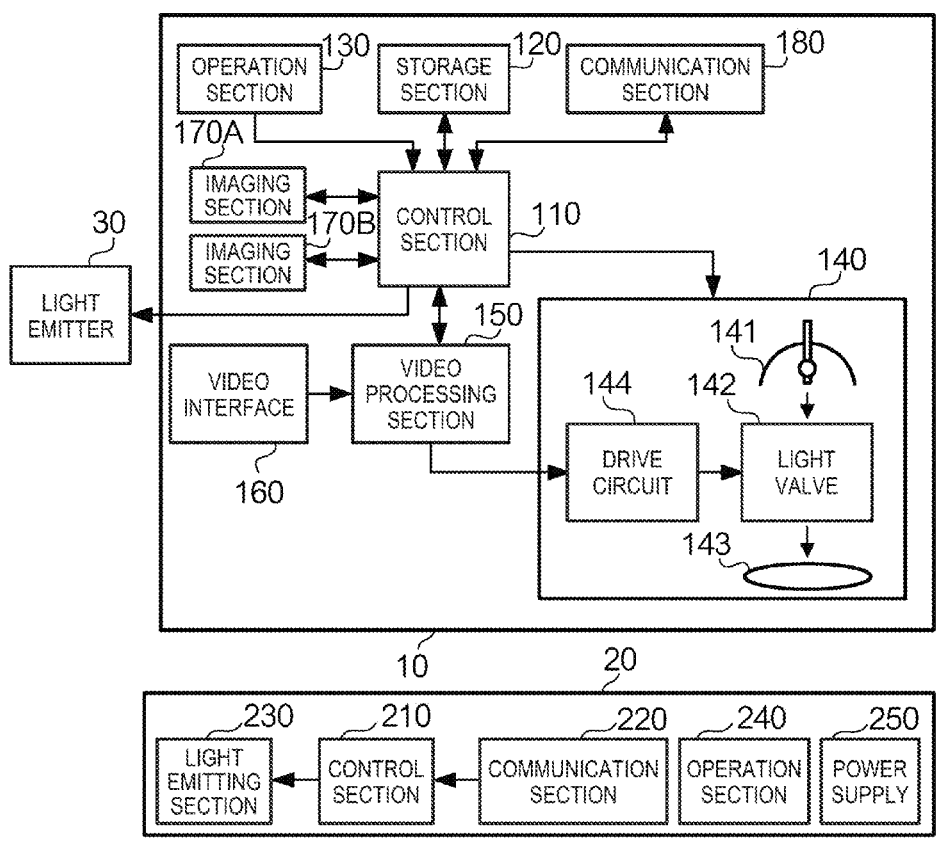
FIG. 2 shows a hardware configuration of a projector and an indicating body.

FIG. 2 shows a hardware configuration of the projector 10 and the indicating body 20. The indicating body 20 includes a control section 210, a communication section 220, a light emitting section 230, an operation section 240, and a power supply 250. The power supply 250 is, for example, a dry battery or a secondary battery and supplies the control section 210, the communication section 220, the light emitting section 230, and the operation section 240 with electric power. The operation section 240 has a switch (not shown) that controls electric power supplied from the power supply 250 to the sections described above. When the switch on the operation section 240 is turned on, the power supply 250 supplies each of the sections with electric power, whereas when the switch on the operation section 240 is turned off, the power supply 250 stops supplying each of the sections with electric power. The light emitting section 230 has a light emitting diode that emits infrared light, and the light emitting section 230 is provided at the front end of the indicating body 20. The turn-on and turn-off actions of the light emitting section 230 are controlled by the control section 210. The light emitting section 230 is a point light source, and the light emitted from the light emitting section 230 spreads from the front end of the indicating body 20 in the form of a spherical wavefront. The communication section 220 includes alight receiving device that receives infrared light. The communication section 220 receives a variety of signals transmitted from the projector 10 in the form of infrared light. The communication section 220 converts the variety of received signals into electric signals and supplies the control section 210 with the electric signals. The control section 210 is connected to the light emitting section 230 and the communication section 220. The control section 210 starts controlling the light emitting section 230 in response to the signals supplied from the communication section 220 and controls the turn-on and turn-off actions of the light emitting diode of the light emitting section 230.

The projector 10 includes a control section 110, a storage section 120, an operation section 130, and a projection section 140. The projector 10 further includes a video processing section 150, a video interface 160, an imaging section 170A, an imaging section 170B, and a communication section 180. The control section 110 is a microcomputer including a CPU (central processing unit), a ROM (read only memory), and a RAM (random access memory). When the CPU executes a program stored in the ROM, the control section 110 controls each of the sections that form the projector 10 to achieve the function of projecting video images on the screen SC, the function of using a finger and the indicating body 20 as a pointing device, the drawing function, the PC operation function, and other functions.

The video interface 160 has a plurality of connectors through which the video signal is supplied, such as connectors that comply with the RCA, D-Sub, HDMI (registered trademark), and USB (universal serial bus) standards and supplies the video processing section 150 with the video signal supplied from the external apparatus to the connector. The video interface 160 is an example of a video acquisition section that acquires a plurality of video signals. The video interface 160 may have a wireless communication interface, such as a wireless LAN interface and a Bluetooth (registered trademark) interface, and may acquire the video signal over wireless communication.

The storage section 120 stores setting values relating to the quality of projected video images and information on the variety of functions described above. The operation section 130 includes a plurality of buttons for operation of the projector 10. Adjustment of video images projected on the screen SC, setting of the variety of functions of the projector 10, or any other type of operation is performed by the corresponding one of the sections described above under the control of the control section 110 in accordance with an operated button. The operation section 130 further includes a light receiver (not shown) that receives an infrared signal from a remote control (not shown). The operation section 130 converts the signal transmitted from the remote control into an electric signal and supplies the control section 110 with the electric signal, and the control section 110 controls the sections described above in accordance with the supplied signal.

The projection section 140 and the video processing section 150 cooperate with each other and function as a display section that displays an image. The video processing section 150 acquires the video signal supplied via the video interface 160. The video processing section 150 further acquires signals carrying on-screen images, such as a GUI for operation of the projector 10, a cursor representing the position pointed with the indicating body 20, and an image drawn by using the drawing function, from the control section 110. The video processing section 150 has a variety of image processing functions and performs image processing on the video signal supplied via the video interface 160 to adjust the quality of video images to be projected. When an on-screen image signal is supplied from the control section 110, the video processing section 150 supplies the projection section 140 with the video signal on which the on-screen image signal is superimposed.

The projection section 140, which projects video images, includes a light source 141, a light valve 142, a drive circuit 144, and a projection system 143. The light source 141 is a lamp that emits light, and the light emitted from the light source 141 is separated by a plurality of dichroic mirrors and reflection mirrors that are not shown into red light, green light, and blue light, each of which is guided to the light valve 142. The light source 141 is not necessarily a lamp and may instead be a light emitting diode or a semiconductor laser device that emits a laser beam.

The drive circuit 144 acquires the video signal supplied from the video processing section 150. The video signal supplied to the drive circuit 144 has grayscale data representing the grayscale of the red component in an image to be projected, grayscale data representing the grayscale of the green component in the image to be projected, and grayscale data representing the grayscale of the blue component in the image to be projected. The drive circuit 144 extracts the grayscale data on the grayscales of the red light, green light, and blue light and drives the light valve 142 on the basis of the extracted grayscale data on the grayscales of the three colors.

The light valve 142 has a liquid crystal light valve on which the red light described above is incident, a liquid crystal light valve on which the green light described above is incident, and a liquid crystal light valve on which the blue light described above is incident. Each of the liquid crystal light valves is a transmissive liquid crystal panel and has pixels arranged in a matrix having a plurality of rows and columns. The liquid crystal light valve on which the red light is incident is driven on the basis of the red grayscale data. The liquid crystal light valve on which the green light is incident is driven on the basis of the green grayscale data. The liquid crystal light valve on which the blue light is incident is driven on the basis of the blue grayscale data. In each of the liquid crystal light valves, each of the pixels therein is so controlled by the drive circuit 144 that the transmittance of the pixel changes. Since the transmittance of each of the pixels is controlled, the color light fluxes having passed through the liquid crystal light valves form images corresponding to the respective grayscale data. The images formed by the red, green, and blue light fluxes having passed through the liquid crystal light valves are combined with one another by a dichroic prism that is not shown, and the combined image is incident on the projection system 143. The projection system 143 is an optical system that enlarges an image incident thereon, enlarges the incident image with the aid of lenses and mirrors, and projects the enlarged image on the screen SC. When an image is projected on the screen SC, the image is displayed on the screen SC, which is the display surface. It is noted that reflective liquid crystal panels may be employed in place of the transmissive liquid crystal panels or a digital mirror device or any other device may instead be used.

The projector 10 includes the two imaging sections 170A and 170B for identifying the position of the indicating body 20 or a finger and the distance to the screen SC by using a stereo method. Each of the imaging sections 170A and 170B includes an imaging device (such as CMOS device and CCD) that receives the infrared light emitted from the light emitting section 230 and the infrared light emitted from the light emitter 30 and reflected off a finger, an optical system that forms an image on the imaging device, an aperture that limits the light to be incident on the imaging device, and other components. Each of the imaging sections 170A and 170B images a range containing the screen SC, produces an image of the imaged range, and outputs an image signal carrying the produced image. In the present embodiment, since the projector 10 is installed obliquely above the screen SC, each of the imaging sections 170A and 170B images the range containing the screen SC from obliquely above. The communication section 180 includes a light emitting diode that emits infrared light. In the communication section 180, turn-on and turn-off actions of the light emitting diode are controlled by the control section 110, and the communication section 180 transmits an infrared signal for controlling the turn-on and turn-off actions of the light emitting section 230. The communication section 180 further includes a communication interface for communication with the PC, for example, a USB or LAN communication interface.

Figure 3:
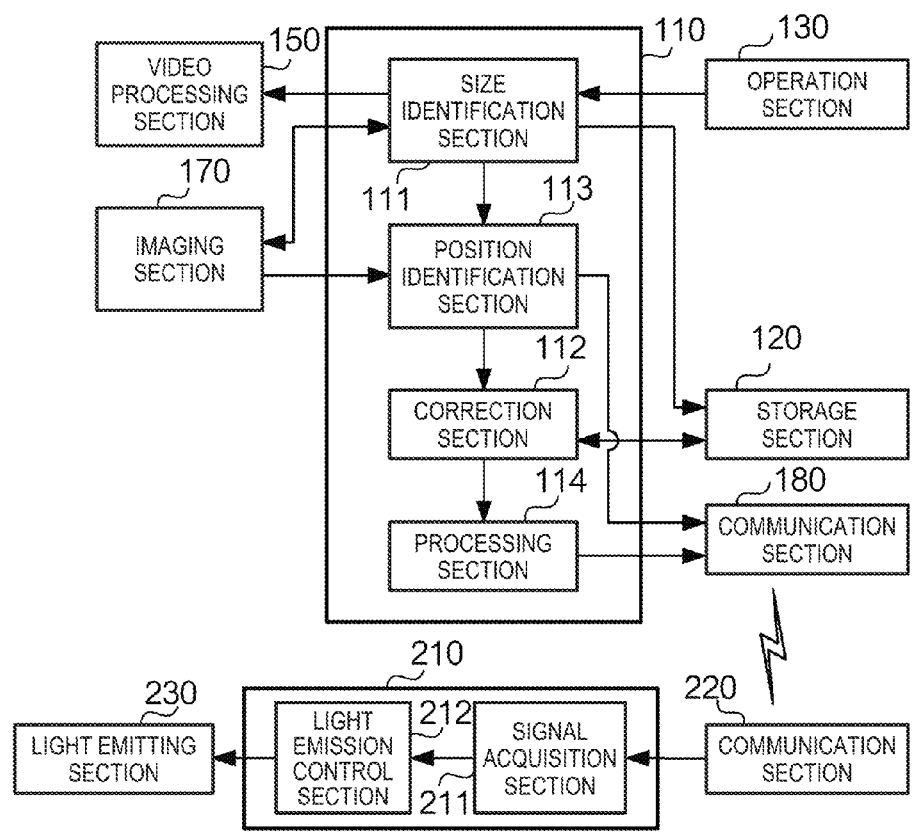
FIG. 3 is functional block diagram of control sections.

FIG. 3 is a functional block diagram showing the configuration of the function achieved when the control section 110 executes the program and the function achieved in the control section 210.

The function achieved in the control section 110 of the projector 10 will first be described. A size identification section 111 identifies the size (dimension) of video images projected on the screen SC when the entire area of the light valve 142 transmits the light from the light source 141. Specifically, the size identification section 111 supplies the video processing section 150 with an image of a pattern specified in advance and causes the video processing section 150 to project the pattern on the screen SC. The size identification section 111 causes the imaging sections 170A and 170B to capture images of the pattern projected on the screen SC, analyzes the images supplied from the imaging sections 170A and 170B, and identifies the distance from the projector 10 to the screen SC and the size of the images projected on the screen SC on the basis of the dimension of the images of the captured pattern. The size identification section 111 may instead acquire information on the distance and the size inputted by the user who operates the remote control or the operation section 130. The information that the size identification section 111 should acquire is not limited to the distance or the size itself and only needs to be information relating to the distance and the size (information corresponding to the distance and information corresponding to the size). As for the distance from the imaging sections 170A and 170B to the display surface out of the information described above, the projector 10 may be provided with a distance sensor, and the distance from the imaging sections 170A and 170B to the display surface may be obtained from a result of measurement performed by the distance sensor.

Figures 4, 5:
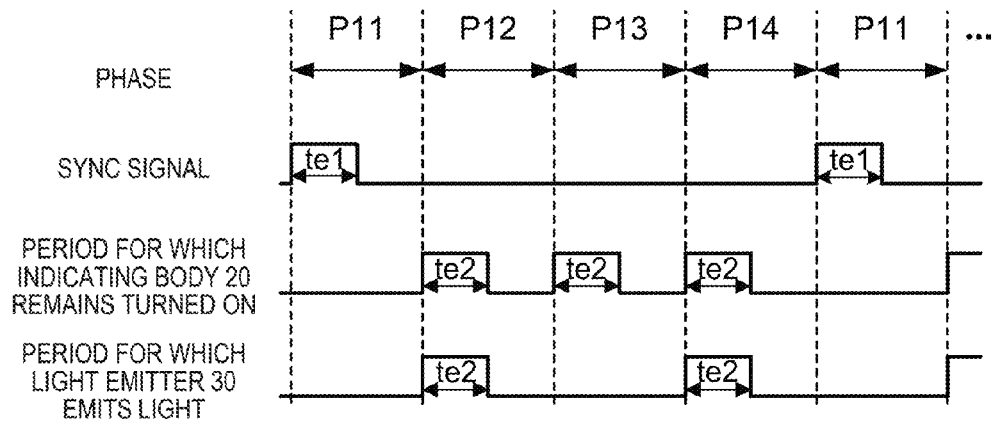
FIG. 4 shows an example of a time chart in accordance with which an indicating body is detected.
FIG. 5 shows an example of a table.

A position identification section 113 periodically identifies the position of the light emitting section 230 of the indicating body 20 or the position of a finger, which is an example of the indicating body, in the image projection area in accordance, for example, with the time chart shown in FIG. 4. The period for which the position of a finger or the position of the light emitting section 230 is identified has four phases, a phase P11 to a phase P14, as shown in FIG. 4. To detect the position of a finger or the position of the light emitting section 230, the phases P11 to P14 are repeated. The phase P11 is a phase for synchronization of the timing at which the projector 10 causes the imaging sections 170A and 170B to perform imaging with the timing at which the indicating body 20 emits light and the timing at which the light emitter 30 emits infrared light. In the phase P11, the position identification section 113 controls the communication section 180 in such a way that an infrared sync signal is outputted via the communication section 180 for a predetermined period te1.

In the indicating body 20, the communication section 220 receives the sync signal, and the control section 210 controls the light emitting section 230 in such a way that after the sync signal is received and a predetermined period then elapses, the light emitting section 230 remains turned on for a period te2 set in advance. In the present embodiment, the light emitting section 230 is so controlled as to be turned on at the point of time from which each of the phases P12, P13, and P14 starts. Further, the position identification section 113 controls the light emitter 30 in such a way that the light emitter 30 emits the infrared light for the period te2 stating at the point of time from which each of the phases P12 and P14 starts.

The position identification section 113 controls the imaging sections 170A and 170B in the phases P12 to P14 to cause them to image a predetermined range of the screen SC at a set shutter speed. The light exposure period for which the imaging sections 170A and 170B perform light exposure by using an electronic shutter function starts from the point of time when each of the phases P12 to P14 starts, and the point of time when the light exposure ends is determined by the set shutter speed. Image signals carrying images captured by the imaging sections 170A and 170B for the light exposure period in each of the phases P12 to P14 are supplied to the position identification section 113.

The position identification section 113 uses the images carried on the image signals supplied from the imaging sections 170A and 170B to identify the position of a finger or the light emitting section 230 present on the projected images and the distance from the screen SC to the light emitting section 230. Specifically, in the phases P12 and P14, in the case where the finger is irradiated with the infrared light emitted from the light emitter 30, the infrared light emitted from the light emitter 30 and reflected off the finger is displayed on the images produced by the imaging sections 170A and 170B. Further, in the phases P12 and P14, in a case where the light emitting section 230 falls within the imaging ranges of the imaging sections 170A and 170B, the infrared light emitted from the light emitting section 230 is also displayed in the images produced by the imaging sections 170A and 170B. In the phase P13, since the light emitter 30 does not emit light, the infrared light emitted from the light emitting section 230 is displayed in the images produced by the imaging sections 170A and 170B.

The position identification section 113 identifies, in the phases P12 to P14, the position of the infrared light displayed in the images produced by the imaging sections 170A and 170B and the distance to the screen SC by using a stereo method. Out of the infrared light the position of which is identified in the phase P12 and the infrared light the position of which is identified in the phase 14, the position identification section 113 identifies the infrared light located in the position closer to the position of the infrared light identified in the phase P13 and sets the position of the identified infrared light as the position of the light emitting section 230. Further, out of the infrared light the position of which is identified in the phase P12 and the infrared light the position of which is identified in the phase 14, the position identification section 113 sets the position of the infrared light farther from the position of the infrared light identified in the phase P13 as the position of the finger. In a case where no infrared light is present in the imaging ranges in the phase P13, the position identification section 113 sets the positions identified in the phases P12 and P14 as the position of the finger. These identified positions are used when the finger or the indicating body 20 is used as a pointing device or when the variety of functions are performed.

A correction section 112 corrects the positions identified by the position identification section 113. When the state in which the position of the finger has not been detected transitions to the state in which the position of the finger has been detected, the correction section 112 stores the position of the finger after the transition. In a case where a new position of the periodically identified finger is shifted from the stored position but falls within a correction range specified in advance, the correction section 112 corrects the position of the finger to the stored position from the newly identified position of the finger. On the other hand, in a case where a new position of the periodically identified finger is shifted from the stored position and does not fall within the correction range specified in advance, the correction section 112 sets the periodically and a new, periodically identified position as the position of the finger until the position of the finger is not detected any more.

The correction section 112 has a table TB1, in accordance with which the range described above is determined. FIG. 5 shows an example of the table TB1. In the present embodiment, the correction range used in the position correction is so set as to decrease as the video image size identified by the size identification section 111 increases, as shown in FIG. 5. For example, in a case where the video image size identified by the size identification section 111 is 50 inches (first dimension), the correction section 112 uses the stored position to set the center of the correction range, and in a case where a new position of the finger is shifted from the coordinates of the center but the amount of shift is smaller than or equal to 10 coordinates (within first correction range), the correction section 112 corrects the position of the finger to the stored position. In a case where the video image size identified by the size identification section 111 is 100 inches (second dimension) or more, the correction section 112 uses the stored position to set the center of the correction range, and in a case where a new position of the finger is shifted from the coordinates of the center but the amount of shift is smaller than or equal to 5 coordinates (within second correction range), the correction section 112 corrects the position of the finger to the stored position.

A processing section 114 carries out a process according to the position identified by the position identification section 113. As the process according to the identified position, for example, in a case where the drawing function is used, the processing section 114 carries out the process of drawing an image in the identified position in a projected image or the process of erasing the drawn image from the projected image. In a case where the PC operation function is used, the processing section 114 carries out, for example, the process of transmitting information representing the identified position to the PC.

The function achieved in the control section 210 of the indicating body 20 will next be described. A signal acquisition section 211 acquires the sync signal received by the communication section 220. A light emission control section 212 acquires the sync signal from the signal acquisition section 211, and after the sync signal is acquired and a predetermined period then elapses, the light emission control section 212 controls the light emitting section 230 in such a way that the light emitting section 230 remains turned on for the period te2 in each of the phases P12 and P14.

Example of Action in Embodiment

An example of action in the present embodiment will next be described. Before using the projector 10, the user first performs, as an initial setting, operation of issuing an instruction to identify the size of video images projected on the screen SC. After the operation, the size identification section 111 controls the video processing section 150 in such a way that the image of the pre-specified pattern described above is projected on the screen SC. The imaging sections 170A and 170B image an area containing the screen SC. The imaging sections 170A and 170B produce images of the imaged area and output image signals carrying the produced images to the control section 110. The size identification section 111 analyzes the images carried on the image signals outputted from the imaging sections 170A and 170B and identifies the distance from the projector 10 to the screen SC and the size of the images projected on the screen SC on the basis of the dimension of the pattern described above and contained in the images. Having identified the size of the projected video images, the size identification section 111 causes the storage section 120 to store the identified size.

An example of the action of the projector 10 in a state in which the projector 10 has turned on the PC operation function and is projecting the screen of the PC and the user's finger is used as a pointing device will next be described with reference to the flowchart in FIG. 6.

Figure 6:
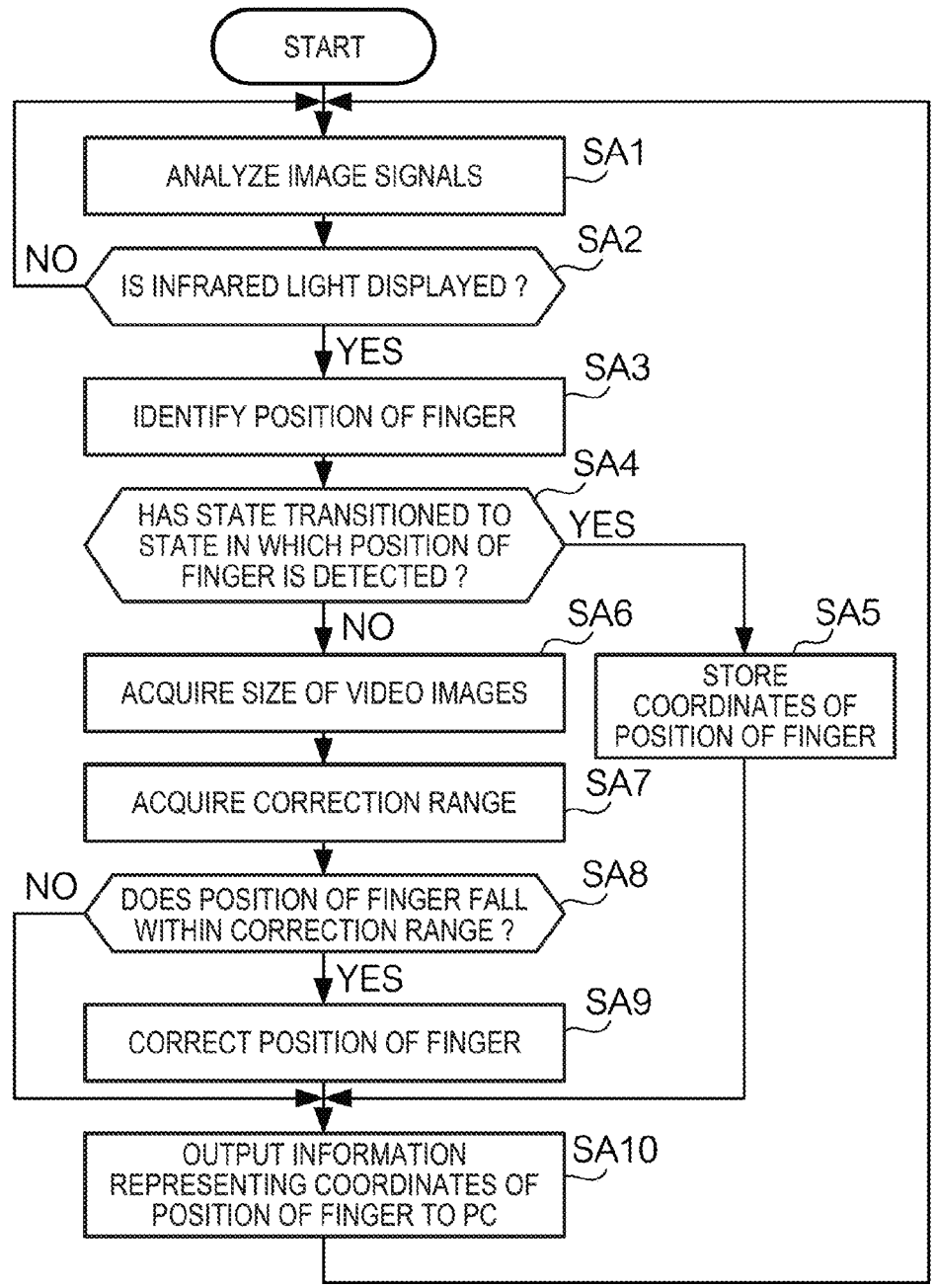
FIG. 6 is a flowchart showing the procedure of the process of correcting the position of a finger.

FIG. 6 is a flowchart showing the procedure of the process of correcting the position of the finger. FIGS. 7A to 7D diagrammatically show part of the screen SC viewed from above. In FIGS. 7A to 7D, the broken lines indicate an infrared light layer (the layer is hereinafter referred to as a light curtain LC for ease of description) formed along the screen SC by the light emitter 30.

Figure 7A:
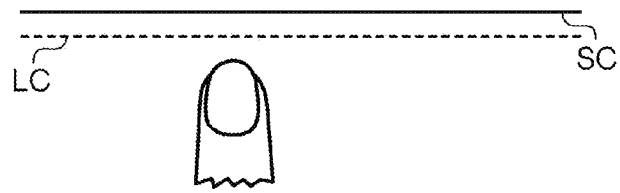
FIGS. 7A to 7D diagrammatically show part of a screen viewed from above.

In a case where the projector 10 is using the PC operation function, the position identification section 113 identifies the position of the indicating body 20 or a finger. FIG. 7A shows a state in which the finger is not in contact with the light curtain LC. In this state, since the infrared light that forms the light curtain LC is not reflected off the finger, the position identification section 113 does not identify the position of the finger.

Figure 7B:
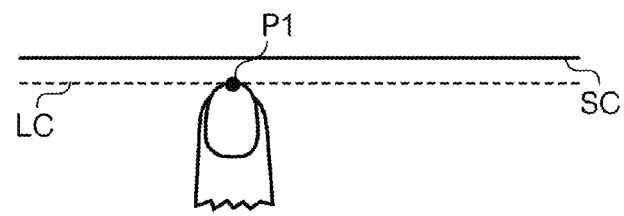

When the finger is so moved from the state shown in FIG. 7A as to approach the screen SC, and the front end of the finger comes into contact with the light curtain LC, as shown in FIG. 7B, the imaging sections 170A and 170B image the infrared light reflected off the front end of the finger. The imaging sections 170A and 170B output image signals carrying the images in which the infrared light reflected off the finger is displayed to the control section 110. The position identification section 113 acquires the image signals outputted from the imaging sections 170A and 170B. The position identification section 113 analyzes the acquired image signals (step SA1), and in a case where the infrared light is displayed in the images carried on the image signals (YES in step SA2), the position identification section 113 identifies the coordinates of the position where the infrared light is displayed as the position of the finger (step SA3). For example, in the present embodiment, the coordinates of the position P1 shown in FIG. 7B are identified as the position of the finger.

In the present embodiment, the control section 110 sets an xy coordinate system in the images produced by the imaging sections 170A and 170B in such a way that the upper left vertex of the image projection area is the origin, the rightward direction from the origin is the positive direction of the x axis, and the downward direction from the origin is the positive direction of the y axis, but the setting of the coordinates is not limited to the aspect described above and may be another aspect.

The position identification section 113 supplies the correction section 112 with the coordinates of the identified position. When the state in which the position of the finger has not been detected transitions to the state in which the position of the finger has been detected (YES in step SA4) because the position of the finger changes from the state in FIG. 7A to the state in FIG. 7B, the correction section 112 causes the storage section 120 to store the coordinates of the position after the transition (first position) (step SA5). Having completed the storage of the coordinates, the position identification section 113 outputs the coordinates of the identified position to the processing section 114 and directs the process procedure to step SA10.

Thereafter, in the case where the PC operation function is used, the processing section 114 outputs information representing the coordinates of the position of the finger through the communication section 180 to the PC (step SA10). Having acquired the information representing the coordinates, the PC carries out a process according to the acquired coordinates. For example, in a case where the coordinates outputted from the projector 10 represent the position of an icon on the screen of the PC, the PC carries out the same process as the process carried out when a finger touches the position of the icon on the touch panel of the PC.

Figure 7C:
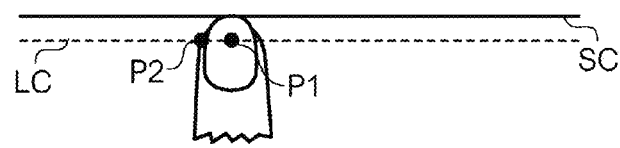

Thereafter, when the finger is so moved from the state in FIG. 7B as to approach the screen SC, and the finger comes into contact with the screen SC, as shown in FIG. 7C, the infrared light reflected off the finger changes. The imaging sections 170A and 170B image the infrared light reflected off the finger and outputs image signals carrying the captured images to the control section 110. The position identification section 113 acquires the image signals outputted from the imaging sections 170A and 170B. The position identification section 113 analyzes the acquired image signals, and in a case where the infrared light is displayed in the images carried on the image signals (YES in step SA2), the position identification section 113 identifies the coordinates of the position where the infrared light is displayed as the position of the finger (step SA3). In the state shown in FIG. 7C, the coordinates of the position P2 shown in FIG. 7C are identified as the position of the finger.

The position identification section 113 supplies the correction section 112 with the coordinates of the identified position. When the state in which the position of the finger has been detected continues (NO in step SA4), the correction section 112 acquires the video image size stored in the storage section 120 from the storage section 120 (step SA6). Having acquired the size of the projected video images, the correction section 112 refers to the table TB1 and acquires the correction range related to the acquired size (step SA7). For example, in the case where the acquired video image size is 50 inches, the correction section 112 acquires "10" as the correction range.

Figure 8A:
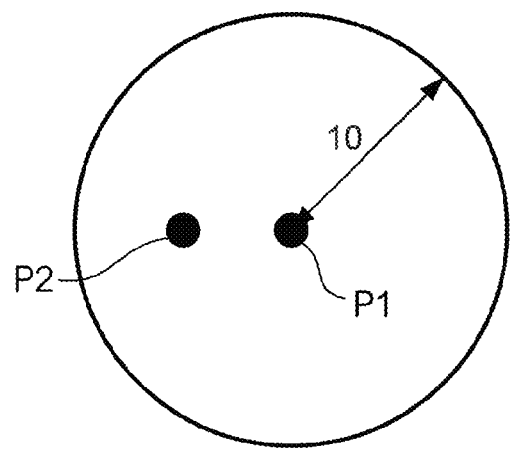
FIGS. 8A to 8C describe correction action performed by a correction section.
Figure 8B:
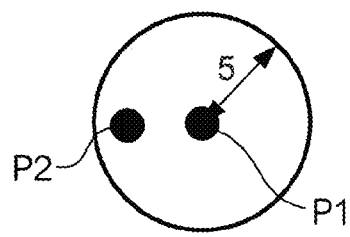
Figure 8C:
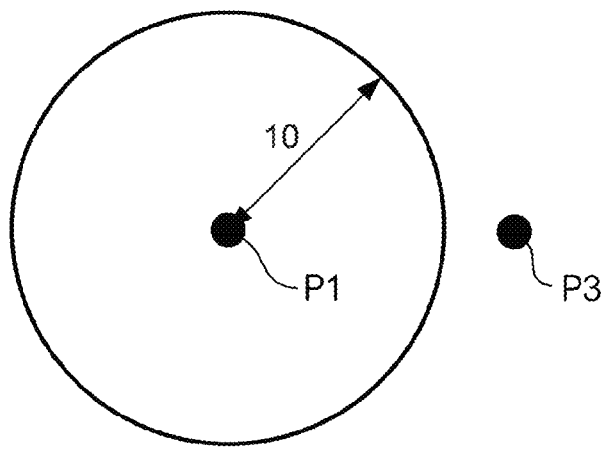

FIGS. 8A to 8C describe correction action performed by the correction section 112. Having acquired a range from the table TB1, the correction section 112 uses the coordinates stored in step SA5 to set the center of the correction range, and in a case where the coordinates of the finger position identified in step SA3 are shifted from the coordinates of the center but fall within the acquired correction range (YES in step SA8), the correction section 112 corrects the position of the finger to the position stored in the storage section 120 (step SA9). For example, in the case where the size of the video images is 50 inches and the acquired correction range is "10", and in a case where the coordinates of P2 are shifted from the coordinates of P1 stored in step SA5 but fall within the correction range of "10", as shown in FIG. 8A, the correction section 112 corrects the coordinates of the position of the finger to the coordinates of P1. In the case where the size of the video images is 100 inches and the acquired correction range is "5", and in a case where the coordinates of P2 are shifted from the coordinates of P1 stored in step SA5 but fall within the correction range of "5", as shown in FIG. 8B, the correction section 112 corrects the coordinates of the position of the finger to the coordinates of P1. The correction section 112 outputs the coordinates of the position of the finger after the correction to the processing section 114.

The processing section 114 sets the corrected coordinates as the coordinates of the position of the finger and outputs information representing the corrected coordinates through the communication section 180 to the PC (step SA10). Having acquired the information representing the coordinates, the PC carries out a process according to the acquired coordinates. As described above, in the case where the coordinates are corrected to those of P1, the PC does not carry out a drag process or does not shift the position of an icon because the coordinates have not changed from the initially acquired coordinates.

Figure 7D:
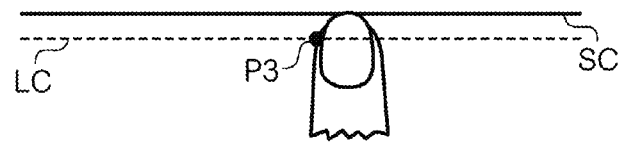

When the finger is moved from the state in FIG. 7C along the screen SC, as shown in FIG. 7D, the position of the infrared light reflected off the finger changes in the images carried on the image signals outputted from the imaging sections 170A and 170B. The position identification section 113 analyzes the acquired imaged signals, and in the case where the infrared light is displayed in the images carried on the image signals (YES in step SA2), the position identification section 113 identifies the coordinates of the position where the infrared light is displayed as the position of the finger (step SA3). In the state shown in FIG. 7D, the coordinates of the position P3 shown in FIG. 7D are identified as the position of the finger.

The position identification section 113 supplies the correction section 112 with the coordinates of the identified position. When the state in which the position of the finger has been detected continues (NO in step SA4), the correction section 112 acquires the video image size stored in the storage section 120 from the storage section 120 (step SA6). Having acquired the size of the projected video images, the correction section 112 refers to the table TB1 and acquires the correction range related to the acquired size (step SA7). For example, in the case where the acquired video image size is 50 inches, the correction section 112 acquires "10" as the correction range.

Having acquired a range from the table TB1, the correction section 112 uses the coordinates stored in step SA5 to set the center of the correction range, and in a case where the coordinates of the finger position identified in step SA3 are shifted from the coordinates of the center and do not fall within the acquired correction range (NO in step SA8), the correction section 112 does not correct the coordinates of the position of the finger but allows the position of the finger to remain the same or in the coordinates of the position identified in step SA3. For example, in the case where the size of the video images is 50 inches and the acquired correction range is "10", and in a case where the coordinates of P3 are shifted from the coordinates of P1 stored in step SA5 and do not fall within the correction range of "10", as shown in FIG. 8C, the correction section 112 does not correct the coordinates of the position of the finger but allows the position of the finger to remain the same or in the coordinates of the position P3. In this case, the correction section 112 outputs the coordinates of the position P3 to the processing section 114.

The processing section 114 then outputs information representing the coordinates of the identified finger position through the communication section 180 to the PC (step SA10). Having acquired the information representing the coordinates, the PC carries out a process according to the acquired coordinates. As described above, in the case where the coordinates change to those of P3, the PC carries out a drag process or shifts the position of an icon because the coordinates have changed from the initially acquired coordinates.

In a case where the correction section 112 makes no correction, and when the state in FIG. 7B transitions to the state in FIG. 7C so that the coordinates of the position of the finger change from P1 to P2, the PC having acquired the coordinates of P2 after the coordinates of P1 carries out the process of moving an icon located in the position P1 to the position P2. In this case, the icon undesirably moves although the user has done nothing but moved the finger toward the screen SC and has not moved the finger in the direction along the display surface.

On the other hand, in the invention, the correction section 112 corrects the coordinates of the position of the finger, as described above. In this case, even when the state in FIG. 7B transitions to the state in FIG. 7C, the coordinates of the position P2 is corrected to the coordinates of the position P1, whereby the coordinates of the position of the finger do not change when the user moves the finger toward the screen SC, and an icon does not therefore move.

After the position of the finger moves from P1 and goes out of the correction range, the correction section 112 does not correct the position of the finger as long as the position of the finger remains identified and outputs the coordinates of the position identified in step SA3 to the processing section 114.

Variations

The embodiment of the invention has been described above, but the invention is not limited to the embodiment described above and can be implemented in a variety of other forms. For example, the invention may be implemented with the embodiment described above changed as will be described below. The embodiment described above and the following variations may be implemented in the form of an appropriate combination of one or more thereof.

In the embodiment of the invention, the table TB1 may instead be stored in the storage section 120, and the correction section 112 may refer to the table TB1 stored in the storage section 120.

In the embodiment of the invention, the coordinates of an identified position of the indicating body 20 may be corrected as in the case where a finger is used. For example, the position identification section 113 sets an xyz coordinate system in such a way that the direction of a perpendicular to the screen SC is the direction of the z axis. The correction section 112 stores the coordinates of the light emitting section 230 in the x-axis direction and the y-axis direction in the storage section 120 when the light emitting section 230 approaches the screen SC and the coordinates of the light emitting section 230 in the z-axis direction reach coordinates specified in advance. Thereafter, in a case where the x-axis and y-axis coordinates of the light emitting section 230 that are identified next fall within a correction range acquired from the table TB1, the correction section 112 corrects the coordinates identified by the position identification section 113 to the coordinates stored in the storage section 120. According to the variation, even in the case where the indicating body 20 is used, no drag process is carried out so that an icon or an object does not move when the user does nothing but causes the indicating body 20 to approach the screen SC.

Figures 9, 10:
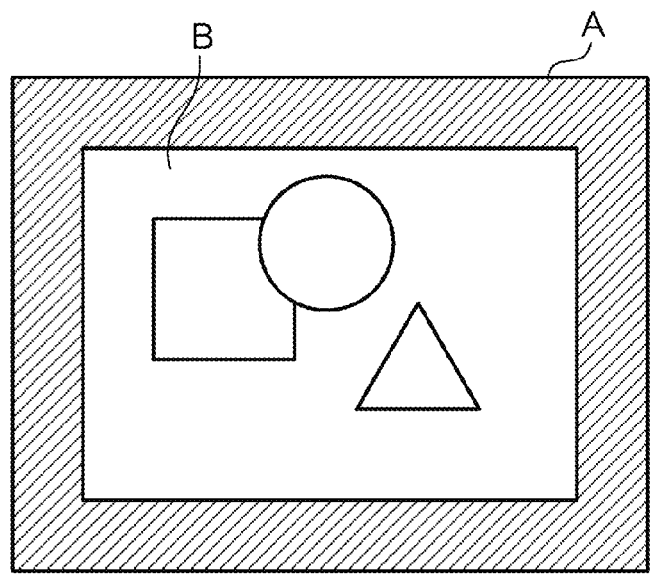
FIG. 9 shows an example of a table according to a variation.
FIG. 10 shows an example of video images projected on the screen.

In the embodiment described above, the table TB1 stores correction ranges with the correction ranges related to ranges of the size of video images, but this configuration is not necessarily employed. For example, the size of video images may be related to the correction range, as shown in FIG. 9. To use the table TB1 shown in FIG. 9, in the case of a video image size that is not stored in the table, the first digit of an identified video image size may be omitted, and a correction range corresponding to the video image size after the first digit is omitted may be used. For example, in a case where the video image size identified by the size identification section 111 is 55 inches, the correction section 112 sets the video image size at 50 inches, which is the size with the first digit of the video image size omitted, and acquires the correction range "10" related to 50 inches.

In the embodiment described above, the size identification section 111 identifies the size of video images in the case where the entire area of the light valve 142 is projected on the screen SC, but the size to be identified is not limited to the size described above.

FIG. 10 shows an example of video images projected on the screen SC. In FIG. 10, an outer rectangular area A represents the area of video images projected on the screen SC in the case where the entire area of the light valve 142 transmits the light from the light source 141. The size of the area A is identified by the size identification section 111 when video images of the pre-specified pattern described above is projected.

In some video signals supplied to the projector 10, the area containing video images is narrower than the area A. In this case, a black band is produced in a portion (hatched portion) outside an area B containing effective video images (effective area), as shown in FIG. 10. When such video images are projected, the size identification section 111 analyzes the projected image and identifies the size of the area B. The correction section 112 then uses the sizes of the area A and the area B to change a correction range acquired from the table TB1. Specifically, the correction ranges is set as follows: "correction range=correction range acquired from table TB1 X (width of area A/width of area B)." According to the present variation, the correction range is changed in accordance with the size of the area containing video images, whereby a situation in which an icon undesirably moves even when the user has not moved the finger in the direction along the display surface can be avoided.

What is claimed is:
1. A projector comprising:
   a projection section that projects an image on a display surface;
   an imaging section that images the display surface and outputs a captured image produced by the imaging;
   a size identification section that identifies a dimension of the image projected on the display surface based on the captured image;

a position identification section that periodically identifies coordinates of a position of an indicating body with respect to the display surface based on the captured image;

a correction section that determines a correction range for correction of the coordinates in accordance with the dimension of the image identified by the size identification section, corrects the coordinates of the position of the indicating body, in a case where coordinates newly identified by the position identification section are shifted from first coordinates identified before the newly identified coordinates but fall within the correction range, to the first coordinates, and outputs the corrected coordinates; and a processing section that outputs the coordinates outputted by the correction section to an external apparatus, wherein the correction section uses a first correction range as the correction range in a case where the dimension of the image identified by the size identification section is equal to a first dimension and uses a second correction range narrower than the first correction range as the correction range in a case where the dimension of the image identified by the size identification section is equal to a second dimension greater than the first dimension.

2. The projector according to claim 1,
further comprising a light emitter that forms a light layer along the display surface,
wherein the imaging section images the light reflected off the indicating body, and
the position identification section identifies the coordinates of the position of the indicating body based on a position of the light displayed in the image outputted by the imaging section.

3. The projector according to claim 1,
wherein the size identification section identifies part of the image as an effective area, and
the correction section determines the correction range in accordance with a ratio of the dimension identified by the size identification section to a dimension of the effective area identified by the size identification section.

4. The projector according to claim 1,
wherein the correction section has a table that relates the dimension to the correction range, and
a correction range that is in the table and related to the dimension identified by the size identification section is determined as the correction range.

5. The projector according to claim 4,
wherein in a case where the table does not contain the dimension identified by the size identification section, the correction section selects a correction range related to a dimension smaller than the dimension identified by the size identification section from dimensions contained in the table as the correction range for correction of the position.

6. The projector according to claim 1,
wherein the first coordinates are the coordinates of the position of the indicating body in a case where a state in which the coordinates of the position of the indicating body have not identified transitions to a state in which the coordinates have been identified.

7. The projector according to claim 1,
wherein in a case where the coordinates of a position newly identified by the position identification section are shifted from the first coordinates and do not fall within the correction range, the correction section outputs the coordinates of the newly identified position.

8. A method for controlling a projector including a projection section that projects an image on a display surface and an imaging section that images the display surface and outputs a captured image produced by the imaging, the method comprising:
identifying a dimension of the image projected on the display surface based on the image outputted by the imaging section;
periodically identifying coordinates of a position of an indicating body with respect to the display surface based on the captured image;
determining a correction range for correction of the coordinates in accordance with the dimension of the image identified in the identifying of the dimension of the image, correcting the coordinates of the position of the indicating body, in a case where coordinates newly identified in the identifying of the coordinates of the position of the indicating body are shifted from first coordinates identified before the newly identified coordinates but fall within the correction range, to the first coordinates, and outputting the corrected coordinates; and
outputting the corrected coordinates to an external apparatus,
wherein the correcting of the coordinates of the position of the indicating body uses a first correction range as the correction range in a case where the dimension of the image identified in the size identification step is equal to a first dimension and uses a second correction range narrower than the first correction range as the correction range in a case where the dimension of the image identified in the size identification step is equal to a second dimension greater than the first dimension.

* * * * *